UNITED STATES PATENT OFFICE.

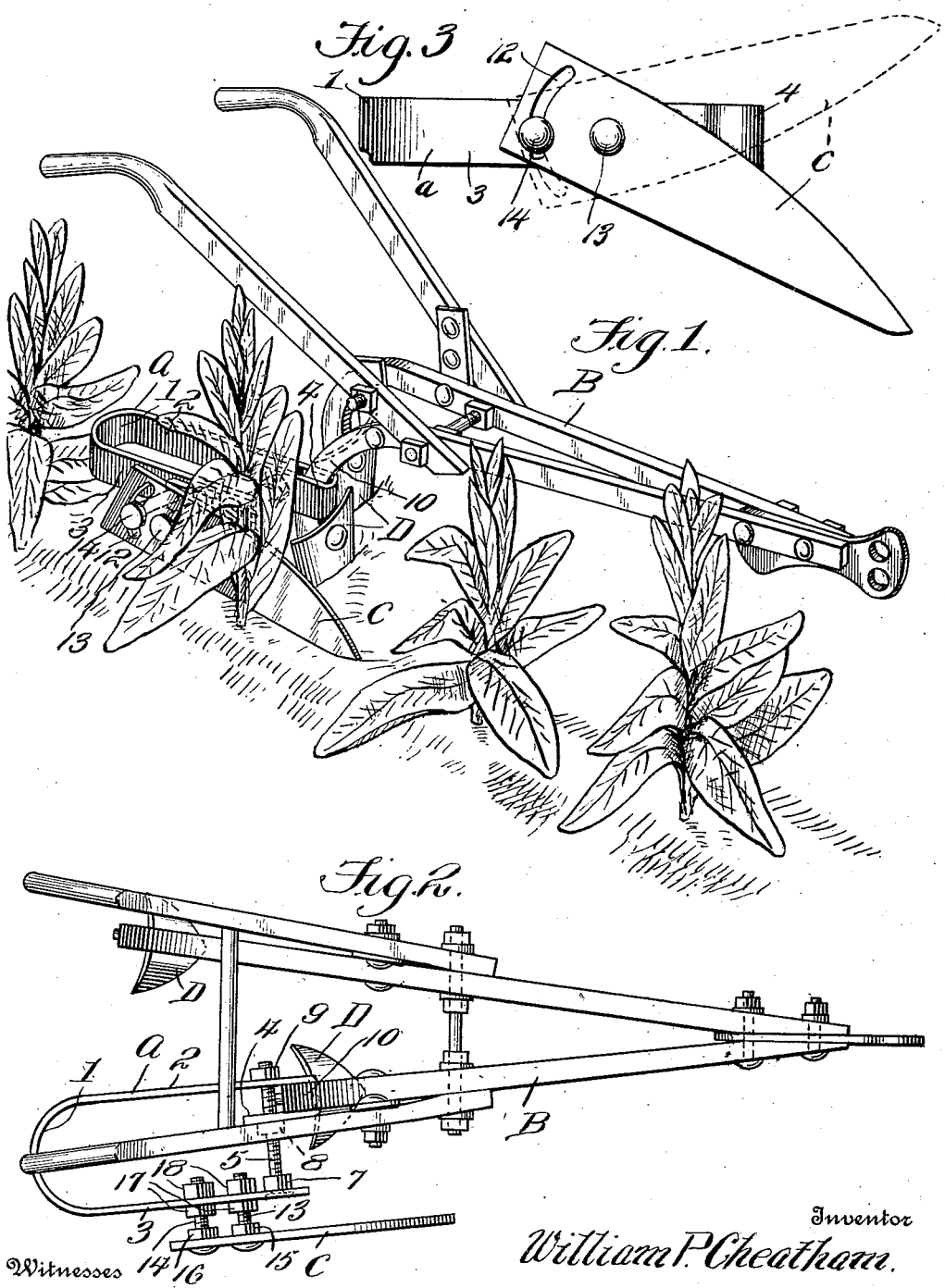

WILLIAM PRESTON CHEATHAM, OF MACKVILLE, KENTUCKY.

CULTIVATOR-FENDER.

1,018,298.  Specification of Letters Patent.  Patented Feb. 20, 1912.

Application filed March 21, 1911. Serial No. 615,868.

*To all whom it may concern:*

Be it known that I, WILLIAM PRESTON CHEATHAM, a citizen of the United States, residing at Mackville, in the county of Washington and State of Kentucky, have invented new and useful Improvements in Cultivator-Fenders, of which the following is a specification.

This invention relates to fenders for plows, cultivators and the like, and it has for its object to provide a simple attachment which may be readily applied to the standard of an ordinary plow or cultivator and which will serve to protect the plants in the row that is being operated upon.

A further object of the invention is to provide an attachment of simple and improved construction which may be readily reversed so as to be fitted to the right or left hand side of the plow or cultivator.

A still further object of the invention is to provide a fender attachment which will serve to lift or elevate the leaves of the plants that are being operated upon and keep the same in an elevated position while dirt is being thrown toward the plants, thereby avoiding injury to the leaves.

A still further object of the invention is to provide a fender attachment including a fender blade which may be adjusted to pass above the ground or to engage the ground at the required depth.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a perspective view showing the improved fender attachment applied to a cultivator and showing the same in operation adjacent to a row of plants. Fig. 2 is a top plan view of a cultivator equipped with the fender attachment. Fig. 3 is a side elevation of the fender attachment with dotted lines indicating how the fender blade may be reversed.

Corresponding parts in the several figures are denoted by like characters of reference.

The frame of the improved fender attachment comprises a yoke A which may be formed by bending from a strip of suitable metal such as steel, said yoke comprising the bridge portion 1, an inner arm 2 and an outer arm 3, said arm being so designated because the arm 3 in practice is spaced outwardly from the implement in connection with which the attachment is used. The inner arm 2 is provided at its forward end with a rearwardly extending hook portion 4. A bolt 5 extends through the arms 2, 3 adjacent to the front ends of the latter and also through the hook member 4. The head 6 of the bolt is countersunk in the outer face of the outer arm with which the bolt is firmly connected by means of a nut 7 which is screwed up tightly against the inner face of said outer arm. The bolt is also equipped with nuts 8 and 9, the former of which engages the outer face of the hook member 4, while the nut 9 engages the inner face of the inner arm 2. It will be seen that by tightening said nuts the hook member 4 and the arm 2 may be made to clamp between them the standard 10 of a plow or cultivator, which has been conventionally shown at B.

The fender blade C, which may be of any suitable shape and dimensions, is provided with an aperture 11 and an arcuate slot 12 concentric with said aperture for the passage of bolts 13, 14 which are equipped with nuts 15, 16 engaging the inner face of the blade. The bolts 13, 14 extend through the outer arm 3 of the frame, each bolt being adjustably connected with said arm by means of nuts 17, 18 engaging, respectively, the outer and inner faces of said arm.

It will be seen that by loosening the nuts 15, 16 the blade C may be adjusted about the axis of the bolt 13 within the limits of the arcuate slide 12 and that by retightening said nuts the blade may be secured in adjusted position. This adjustment enables the pointed forward end of the blade C to be tilted downward so as to dig into the ground, if desired, while on the other hand the said blade may be adjusted to and retained in an approximately horizontal position or with its forward point tilted slightly upward, if desired.

When the improved attachment is applied to the shank of an ordinary cultivator, as shown in the drawings, the arm 3 will be spaced outward from such shank and in the direction of the row of plants that is being operated upon. Assuming the fender blade to be supported in an approximately horizontal or slightly downturned position, said fender blade will as the implement is drawn along engage the undersides of the lowermost leaves of the plants, and such leaves will ride upwardly over the inclined upper edge of the blade, being thus gradually lifted to a position where they will be protected from the dirt which is thrown toward the plants by the action of the cultivator blades D. The leaves of the plants will not only ride over the fender blade, but will be guided rearwardly over the outer arm 3 of the fender frame, being thus kept in an out-of-the-way position for a sufficient length of time. When desired, the fender blade may be adjusted with its point digging into the ground as far as may be desired within the limits of the adjustment.

The improved attachment may be applied to one or both sides of a cultivator, assuming the latter to be provided with a plurality of blade-carrying shanks, and the device may be used as a right or left side attachment by simply reversing the blades C, as will be readily understood by reference to Fig. 3 of the drawing, where said reverse position is indicated in dotted lines. It will be readily seen that by properly adjusting the nuts 17, 18 upon the bolts 13, 14, the heads of said bolts, together with the fender blade, may be variously spaced from the outer arms 3 of the fender frame. It is also obvious that by loosening the nuts 8 and 9, the fender frame may be readily raised or lowered to any desired adjustment upon the blade carrying shank 10 of the cultivator.

This improved fender attachment, while useful for a variety of purposes, will be found particularly useful in cultivating tobacco plants where it is essential to protect the leaves from injury, the lowermost leaves of the plants being guided over the fender attachment without danger of injury. The successful growing of the plants will thereby be materially promoted. The improved attachment, as will be seen, is extremely simple in construction and may be manufactured and marketed at a very moderate price.

Having thus described the invention, what is claimed as new, is:—

1. In a fender attachment, a yoke constituting a frame and having inner and outer arms, clamping means associated with the inner arm, bolts extending through the outer arm, nuts upon said bolts engaging the inner and outer faces of said outer arm, a fender blade pivoted upon one of said bolts and adjustably connected with the other bolt, and means for securing the fender blade in adjusted position upon the bolts.

2. In a fender attachment, a yoke constituting a frame and having inner and outer arms, clamping means associated with the inner arm, fender carrying members extending through the outer arm and adjustably connected therewith, a reversible fender blade pivoted upon one of said members and adjustably engaging the other member, and means for securing the fender blade in adjusted position.

In testimony whereof I affix my signature in presence of two witnesses.

WILLIAM PRESTON CHEATHAM.

Witnesses:
J. M. PRENT,
JOHN COLVIN.

---

Copies of this patent may be obtained for five cents each, by addressing the "Commissioner of Patents, Washington, D. C."